United States Patent [19]

Devuyst et al.

[11] Patent Number: 4,514,372
[45] Date of Patent: Apr. 30, 1985

[54] PROCESS OF PRODUCING COBALT-CONTAINING SOLUTIONS AND SALTS

[75] Inventors: Eric A. Devuyst, Toronto; Victor A. Ettel, Mississauga, both of Canada

[73] Assignee: INCO Limited, Toronto, Canada

[21] Appl. No.: 404,613

[22] Filed: Mar. 9, 1983

[51] Int. Cl.³ .............................................. C01G 51/08
[52] U.S. Cl. ...................................... 423/493; 423/150
[58] Field of Search ................................ 423/493, 150

[56] References Cited

U.S. PATENT DOCUMENTS 4,394,366  7/1983  Ettel et al. .......................... 423/493

FOREIGN PATENT DOCUMENTS

87123/82  2/1983  Australia .............................. 423/493
2104498   3/1983  United Kingdom ................ 423/493
2104053   3/1983  United Kingdom ................ 423/493

OTHER PUBLICATIONS

Abstracts of U.S. Pat. Nos. 4,214,894, 4,214,895 and 4,214,896, OG Jul. 29, 1980.
Chem. Abstracts, 94:75882p, 94:164823n, 1981.
Chem. Abstracts, 84:92331u, 1976.
Mellor, vol. XIV, pp. 611-613 & 653, 1935.
Kirk-Othmer, vol. 4, p. 205, 1949.
Young, Roland S., Cobalt, pp. 56-57, Reinhold Pub. Co., 1948.

Primary Examiner—William R. Dixon, Jr.
Assistant Examiner—Steven Capella
Attorney, Agent, or Firm—Miriam W. Leff; Raymond J. Kenny

[57] ABSTRACT

Cobalt salts are produced by dissolving cobalt metal in hydrochloric acid containing a small amount of thiosulfate ions.

8 Claims, No Drawings

PROCESS OF PRODUCING COBALT-CONTAINING SOLUTIONS AND SALTS

The present invention relates to the production of cobalt-containing solutions and salts by a process in which metallic cobalt is dissolved in hydrochloric acid to give a cobalt chloride solution.

Cobalt salts are at present made by dissolving cobalt oxide in acid and crystallising the resulting salt from solution. One of the main reasons why cobalt oxide is used as a starting material rather than metallic cobalt is that the rate of dissolution in acid of the latter is very much slower than the rate of the former. The present invention is based on the observation that metallic cobalt dissolves much more rapidly in hydrochloric acid in the presence of thiosulphate ions ($S_2O_3^=$). The catalysing action of thiosulphate ions in the dissolution of cobalt in hydrochloric acid is particularly surprising since thiosulphate ions have the opposite effect on metallic cobalt in sulphuric acid, that is to say they inhibit dissolution. Futhermore nickel, which is chemically similar to cobalt, dissolves in hydrochloric acid but its reaction is unaffected by the presence of thiosulphate.

Thus, according to the present invention there is provided a process in which metallic cobalt is dissolved in hydrochloric acid characterised in that the hydrochloric acid contains thiosulphate ions.

The process can be operated to obtain a high strength and purity cobalt chloride solution that is suitable for the production in a manner known per se of pure cobalt salts, which may be obtained with a sulphur content of less than 0.05% by weight.

The amount of thiosulphate ions needed to enhance the cobalt dissolution rate is very small and preferably does not exceed 1 g per liter of hydrochloric acid and more preferably does not exceed 0.2 g/l. Although we believe that the thiosulphate ions act catalytically it appears that they are gradually consumed and we have found that this problem can be overcome by adding the thiosulphate ions gradually over the course of the reaction. Preferably the thiosulphate ions are added at a rate dependent on the amount of cobalt to be dissolved. The rate may be up to 25 mg, preferably from 5 to 20 mg, more preferably about 15 mg, of thiosulphate ions per hour per kilogram of undissolved cobalt, but additions as high as 1000 mg per kg of metallic cobalt added in two batches (the first at the beginning and the second half way through a 12 hour process) have been found to be effective, although such large additions are not necessary.

The process can be carried out in the absence of air or oxygen.

The dissolution rate of cobalt increases with temperature and accordingly the temperature of the reaction is preferably kept as high as practicable, and it is desirable to operate at from 80° to 95° C.

The strength of the hydrochloric acid also affects the cobalt dissolution rate and is preferably kept as high as possible, for example in excess of 300 g/l.

The process of the present invention will now be illustrated in the following Examples:

EXAMPLE 1

This Example demonstrates the effects of temperature, hydrochloric acid concentration and addition of sodium thiosulphate on the dissolution of pure electrolyte cobalt metal ROUNDS in pure hydrochloric acid solutions.

In each of tests A to E, a fresh electrolytically produced cobalt metal round weighing about 30 g was suspended in 0.21 liters of leach solution in an open 0.5 liters beaker agitated at 1,000 rpm by means of a magnetic stirrer. The temperature was controlled to ±1° C. of the desired temperature by means of a hot plate. The results are shown in Table 1 and, for the sake of comparison, the average rate of dissolution in grams of cobalt dissolved per hour per kg of cobalt metal has been tabulated.

The results of tests A, B and C show the effect of temperature. As may be expected the rate of leaching increases with increasing temperature.

The results of tests C and E show the effect of acid concentration. It can be seen that a six fold increase in acid concentration only resulted in an approximately two fold increase of the rate of leaching of cobalt.

The effect of adding sodium thiosulphate is shown by comparing tests C and D. Intermittent addition of 0.1 g of $Na_2S_2O_3$ per liter of leach solution respectively at the start of the leach and after 6 hours resulted in a five fold increase in the average rate of dissolution of the cobalt. The effect of sodium thiosulphate upon the rate of cobalt dissolution is instantaneous, and a gradual decrease of rate of leaching towards the rate obtained in the absence of sodium thiosulphate is observed. Continuous addition of $Na_2S_2O_3$ has therefore a more pronounced effect on the rate of cobalt leaching. This is demonstrated in Example 3.

EXAMPLE 2

This Example illustrates the adverse effect of sodium thiosulphate on the dissolution kinetics of pure electrolytic cobalt metal ROUNDS in pure sulphuric acid solutions. The same experimental conditions as described in Example 1 were used.

TABLE 1

| Test | Duration (h) | T (°C.) | HCL (g/l) (Initial) | $Na_2S_2O_3$ (g/l) | Average Rate** of Dissolution g Co hour · kg Co | % of Cobalt Dissolved |
| --- | --- | --- | --- | --- | --- | --- |
| A | 2 | 65 | 216 | 0 | 0.4 | 0.08 |
| B | 4 | 80 | 216 | 0 | 2.0 | 0.8 |
| C | 4.5 | 95 | 216 | 0 | 3.5 | 1.6 |
| D | 12.5 | 95 | 216 | 0.2* | 16.3 | 20.4 |
| E | 4.5 | 95 | 36 | 0 | 1.5 | 0.7 |

*0.1 g/l added initially and 0.1 g/l added after 6 hours.
**In general the dissolution rate is approximately linear.

The results are given in Table II.

It can be seen from the results of tests F and G that the addition of $Na_2S_2O_3$ has an inhibiting effect upon the dissolution of cobalt ROUNDS in sulphuric acid. This in in contrast with the behaviour of the cobalt ROUNDS in hydrochloric acid solution.

EXAMPLE 3

This Example illustrates the effect of continuous addition of $Na_2S_2O_3$ upon the kinetics of dissolution of electro-cobalt ROUNDS in hydrochloric acid solutions.

The experiments were carried out in a dissolution tank or tower filled with electro-cobalt metal rounds. Hydrochloric acid solution of the desired strength was circulated in a closed loop from a pre-heating tank (maintaining the temperature in the electrolyte) through the cobalt metal bed at a rate of 7 liters per hour. When thiosulphate ions were added, a 5 g/l sodium thiosulphate solution was continuously fed to the leach solution at the top of the dissolution tank or tower at the desired rate. Hydrogen gas produced during cobalt dissolution was withdrawn at the top of the dissolution tank through a reflux condenser. The results are given in Tables III, IV and V.

The tests show that the continuous addition of sodium thiosulphate at a rate in the range of 7.5 to 15 mg per hour per kg of cobalt ROUNDS catalyze the dissolution of electro-cobalt ROUNDS (Table III). In the absence of sodium thiosulphate (test H) the rate of leaching of electro-cobalt ROUNDS in hydrochloric acid at 90° C. decreases quickly with increasing leach time and decreasing residual hydrochloric acid concentration.

TABLE II

| Test | Duration (h) | T (°C.) | Initial $H_2SO_4$ (g/l) | $Na_2S_2O_3$ (g/l) | Average Rate of Dissolution g/Co hour · kg Co | % of Cobalt Dissolved |
|---|---|---|---|---|---|---|
| F | 6 | 95 | 50 | 0 | 5.5 | 3.3 |
| G | 6 | 95 | 184 | 0.2 | 2.6 | 1.6 |

With addition of sodium thiosulphate, however, the rate of dissolution of cobalt is not only higher but is also maintained almost constant in the range 330 to 100 g/l residual hydrochloric acid (Table III, tests J and K).

In the absence of sodium thiosulphate, uncorroded cobalt rounds leach very slowly in 432 g/l hydrochloric acid at 50° C., which is close to the boiling temperature (Table IV, test L). At higher temperatures and lower acid concentration, party corroded cobalt rounds also dissolve slowly (Table IV, test N). Heavily corroded cobalt rounds (pitted surface) initially leach at a relatively fast rate in 332 g/l hydrochloric acid solution at 90° C. The rate of leaching quickly decreases with time not only because of a corresponding decrease in hydrochloric acid concentration but also due to smoothening out of the corroded cobalt rounds leading to a decrease in reactive surface area.

When sodium thiosulphate is added at a rate of 7.5 mg per hour per kg of cobalt rounds, the average rate of leaching of cobalt ROUNDS only increases by a factor of about five with an increase of temperature from 60° to 95° C. (Table V, tests P and Q) as compared to a nine-fold increase in the absence of thiosulphate ions (Table I, tests A, B and C).

TABLE III

Conditions: All tests were carried out at 90° C.

| Test | Time (Hours) | $Na_2S_2O_3$ Addition Rate mg $Na_2S_2O_3$ h · kg Co | Solution Analyses (g/l) HCl | Co | Average Rate of Dissolution of Electro-Cobalt Rounds g Co h · kg Co |
|---|---|---|---|---|---|
| H | 0 | 0 | 332 | 0 | — |
|  | 1.5 |  | 314 | 10.2 | 7.4 |
|  | 5.0 |  | 288 | 34.9 | 7.6 |
|  | 20.0 |  | 202 | 102 | 5.5 |
|  | 44.5 |  | 98 | 184 | 4.5 |
| J | 0 | 7.5 | 330 | 0 | — |
|  | 1 |  | 246 | 60.2 | 24.0 |
|  | 3 |  | 98.6 | 185 | 24.7 |
|  | 5 |  | 29.2 | 243 | 19.4 |
|  | 7 |  | 3.65 | 268 | 15.3 |
| K | 0 | 15 | 330 | 0 | — |
|  | 1 |  | 301 | 19.9 | 27.4 |
|  | 5 |  | 190 | 118 | 32.5 |
|  | 10 |  | 76 | 202 | 27.8 |
|  | 20 |  | 4.5 | 255 | 17.6 |
|  | 23.5 |  | 0.5 | 258 | 15.1 |

Test:
H: 4.22 kg Co ROUNDS, 4.6 liters of electrolyte
J: 10 kg Co ROUNDS, 4 liters of electrolyte
K: 3.34 kg Co ROUNDS, 4.6 liters of electrolyte

TABLE IV

Conditions: No thiosulphate added to the solution

| Test | Time (Hours) | T (°C.) | Solution Analyses g/l HCl | Co | Average Rate of Dissolution of Electro-Cobalt Rounds g Co h · kg Co | Feed Cobalt Used |
|---|---|---|---|---|---|---|
| L | 0 | 50 | 432 | 0 | — | Fresh Cobalt rounds |
|  | 1 |  | 430 | 1 | 1 |  |
| M | 0 | 90 | 332 | 0 | — | Corroded Cobalt rounds |
|  | 1.5 |  | 314 | 10.2 | 7.4 |  |
|  | 5.0 |  | 288 | 34.9 | 7.6 |  |
|  | 44.5 |  | 98 | 184.0 | 4.5 |  |
| N | 0 | 95 | 216 | 0 | — | Partly Corroded Cobalt Rounds |
|  | 5 |  | 206 | 7.2 | 2.9 |  |

Test:
L: 1 kg Co rounds, 1 liter of electrolyte
M: 4.22 kg Co rounds, 4.6 liters of electrolyte (same as test H)
N: 1 kg Co rounds, 2 liters of electrolyte

TABLE V

| Test | Time (Hours) | T (°C.) | $Na_2S_2O_3$ Addition Rate mg $Na_2S_2O_3$ h · kg Co | Solution Analysis (g/l) HCl | Co | Average Rate of Dissolution of Electro-Cobalt Rounds g Co h · kg Co |
|---|---|---|---|---|---|---|
| P | 0 | 60 | 7.5 | 216 | 0 | — |
|  | 5.5 |  |  | 180 | 27.4 | 5.00 |
|  | 12.5 |  |  | 125 | 69.4 | 5.55 |
|  | 18.5 |  |  | 108 | 84.1 | 4.55 |
| Q | 0 | 95 | 7.5 | 216 | 0 | — |
|  | 6.5 |  |  | 109 | 83.0 | 25.5 |
|  | 13.5 |  |  | 62 | 120 | 17.8 |

Test:
P: 1 kg of cobalt ROUNDS, 1 liter of electrolyte
Q: 1 kg of cobalt ROUNDS, 2 liters of electrolyte The embodiments of the invention in which an exclusive property or privilege is claimed are defined as follows:

1. The process for dissolving metallic cobalt in hydrochloric acid solution characterized in that said hydrochloric acid solution contains thiosulfate ion.

2. The process in accordance with claim 1 wherein said metallic cobalt is produced electrolytically.

3. The process in accordance with claim 1 wherein said thiosulfate ion is present in solution in an amount up to about 1 gram per liter.

4. The process in accordance with claim 3 wherein said thiosulfate ion does not exceed about 0.2 gram per liter.

5. The process in accordance with claim 1 wherein said thiosulfate ion is present in said solution in an amount between 5 and about 20 milligrams per kilogram of cobalt to be dissolved.

6. The process in accordance with claim 1 wherein said thiosulfate ion is added gradually.

7. The process in accordance with claim 1 wherein the operating temperature is about 80° to about 95° C.

8. The process in accordance with claim 1 wherein said hydrochloric acid solution fed to the dissolution reaction contains 300 grams of HCl per liter of solution.

* * * * *